United States Patent [19]

Bedini

[11] Patent Number: 4,644,422
[45] Date of Patent: Feb. 17, 1987

[54] ANTI-COPY SYSTEM

[75] Inventor: John C. Bedini, Sylmar, Calif.

[73] Assignee: TVI Systems, Ltd., Los Angeles, Calif.

[21] Appl. No.: 506,658

[22] Filed: Jun. 24, 1983

Related U.S. Application Data

[63] Continuation-in-part of Ser. No. 400,630, Jul. 22, 1982.

[51] Int. Cl.$^4$ .................. G11B 15/04; G11B 5/86; G11B 5/02
[52] U.S. Cl. .................................. 360/60; 360/15; 360/27
[58] Field of Search ................ 360/15, 16, 17, 27, 360/60

[56]   References Cited
U.S. PATENT DOCUMENTS

| | | | |
|---|---|---|---|
| 3,004,104 | 10/1961 | Hembrooke | 360/60 |
| 3,963,865 | 6/1976 | Songer | 360/37.1 |
| 4,040,099 | 8/1977 | Cook | 360/60 |
| 4,086,634 | 4/1978 | Cook | 360/60 |
| 4,100,575 | 7/1978 | Morio et al. | 360/37.1 |
| 4,163,253 | 7/1979 | Morio et al. | 360/37.1 |

OTHER PUBLICATIONS

"Crosstalk", Tape Recording Magazine, Feb. 62 issue.

Primary Examiner—Vincent P. Canney

[57] ABSTRACT

An anti-copy system which prevents copying of tapes and records and other source material by placing a degrade signal on an analog source signal to be recorded on a recording device. One embodiment of the system includes a pulse width modulation (PWM) circuit that generates a pulsed signal in a frequency range from near the upper end to well above the range of hearing. The PWM pulsed signal is modulated by the source signal to be recorded. The PWM signal becomes the degrade signal. This degrade signal is keyed so that it is combined with the source signal only when the frequency of the source signal exceeds a desired threshold. The combined source signal and degrade signal are recorded on the original recording. This original recording can be played back without the presence of the degrade signal impacting the audible quality of the reproduced source signal. However, attempts to make taped copies of the original recordings cause the degrade signal to beat against the bias oscillator frequency of the tape recording head, thereby creating harmonic signals that result in distortion and noticeable alteration of the reproduced source signal that are unpleasant and objectionable to the listener. The anti-copy system may be used with stereophonic recordings, monophonic recordings, or even digital recordings of the type wherein an audible tone burst is used to represent desired digital data.

43 Claims, 11 Drawing Figures

ANTI-COPY SYSTEM

CROSS REFERENCE TO RELATED APPLICATIONS

This application is a continuation-in-part of application Ser. No. 06/400,630 filed July 22, 1982.

TECHNICAL FIELD

This invention relates to anti-copying systems and more particularly to an anti-copying system for preventing acceptable copies of original recordings from being made.

BACKGROUND ART

Many attempts have been made to prevent copying of original recordings. Some of these inventions include circuits which compress the signal. A disadvantage of these systems, however, is that they tend to degrade the source material, resulting in an inferior recording. Therefore, because the whole purpose in recording source material is to provide the highest fidelity possible, any device which degrades the source material has, to date, been unacceptable.

Therefore, it is one object of the present invention to provide a system and method for preventing the acceptable recording of copies of original source material.

Yet another object of the present invention is to provide a system and method for preventing the acceptable recording of copies of original source material which does not materially degrade the original source material, thereby allowing the original source material to be played back without noticeably degrading the quality thereof.

Yet another object of the present invention is to provide a system and method for preventing the acceptable recording of copies of original recordings that is simple and easy to utilize.

Still another object of the present invention is to provide a system and method for preventing acceptable copying of original recordings by combining a degrade signal with the original source material signal, and by recording this combined signal onto the original recording such that the degrade signal portion of the combined signal distorts the recorded material when an attempt is made to make a taped copy of the original recording.

DISCLOSURE OF INVENTION

The purpose of the present invention is to provide a system and method to prevent acceptable copying of original recordings without introducing noticeable distortion or degradation into the original source material.

The above purpose and objects are achieved by providing a circuit which combines a degrade signal with the source material signal on an original recording. The degrade signal generated is a signal having a frequency from near the upper end to well above the range of human hearing.

One type of degrade signal is achieved by providing two voltage control oscillators (VCO), one having an output of a square wave and the other having an output of a triangular wave. The square wave and triangular wave are combined in a mixer. The mixer output is then fed to an emitter follower coupled to the source and to an output which, for example, may be a recording head. Thus, the degrade signal is combined with the source material and recorded on the original recording. It will not be audible when the original source material is played back because of its high frequency.

However, when an attempt is made to make a taped copy of the original source material, the degrade signal interacts with the high frequency signals of the tape head oscillator circuit of the recorder to generate harmonic signals within the audible range that distort the recorded source material. The amount of degradation or distortion will depend upon the output level of the combined signal, which is adjustable. In some cases, the original source signal combined with the degrade signal, after interacting with the high frequency tape head oscillator signal of the device upon which a copy is attempted to be made, will cause the played back copy to sound like a fluttering or wavering sound. At other times the copied tape will sound like a high pitched howl. Again the type of degradation will depend upon the frequency adjustment and output level of the degrade signal, combined with the original source.

Another type of degrade signal is generated by modulating the output signal of a pulse width modulator (PWM) circuit with the source signal. This modulated or coded PWM signal is then keyed or triggered so as to be combined with the source signal only when a selected parameter, such as the frequency, of the source signal exceeds a specified threshold level.

The invention is applicable to prevent the copying of records, tapes, and video tapes, and similar original recordings. In the case of video tapes, the degrade signal is combined with the audio signal on the audio tracks. Tapes containing digital data of the type wherein the data is represented by specific tone bursts, as is commonly used on cassette recordings of computer programs (software), may also be protected from copying by use of the present invention. The invention also prevents the copying of transmitted or broadcast source material that is combined with the degrade signal. In such an instance the combined source and degrade signals are transmitted. The degrade signal, however, is not heard because of its high frequency. When an attempt is made to record the transmitted material, however, the degrade signal interacts with the high frequency signals of the bias oscillator circuit of the tape recording head so as to generate undesirable harmonic signals ("harmonics") that distort the recorded material. On playback of such recorded material these recorded harmonics produce unacceptable audible noises on the tape that effectively destroy the quality of the recording.

While the description of the invention most often refers hereinafter to records (plastic discs adapted to be played back on a phonograph or turntable), it is to be understood that the invention has applicability to other media as well, including without limitation, cassette and eight track magnetic tapes, reel-to-reel magnetic tapes, videotapes, and the like.

BRIEF DESCRIPTION OF DRAWINGS

The above and other objects, advantages and novel features of the invention will be more fully understood when considering the following detailed description and the accompanying drawings, in which.

MODES FOR CARRYING OUT THE INVENTION

The present invention provides a degrade signal for combining with an original source material signal that will not degrade the source material when replayed, except when a copy of combined material is made on magnetic media or equivalent. When a taped copy is made, the degrade signal interacts with the bias frequency signals used in the circuits of the copying tape recorder, producing undesirable harmonic signals that are recorded along with the source material signal on the copied tape. When the copied tape is played back, these undesirable harmonic signals are heard, thereby destroying the quality of the copied tape. Thus, the present invention effectively discourages the tape recording of original source material by making listening to the taped copy difficult and unpleasant.

Figure 1:
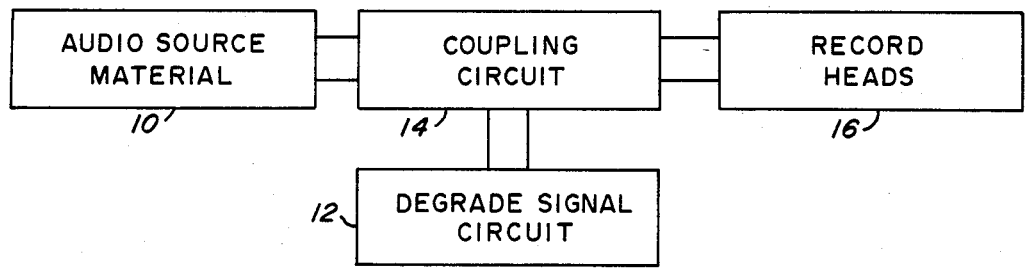
FIG. 1 is a simplified block diagram showing the method in which the degrade signal is combined with an original recording of source material.

Referring to FIG. 1, source material 10, such as audio material to be transmitted or material from a microphone input, is combined with output signals from the degrade signal circuit 12 in coupling circuit 14, which then is fed to tape recorder heads or phonograph cutting heads 16 for making an original tape or record. The degrade signal is recorded on the original recording along with the source material and does not materially affect the normal listening of the original recording, as the degade signal is at a frequency substantially outside of the audible range of humans. For example the lower limit of the degrade signal may be about 17 kilohertz (KHz) and there is no upper limit. Preferably, the frequency is within the range of 17 to 120 KHz.

All tape recorders adapted for recording analog signals, such as audio cassette tape recorders, reel to reel recorders, video recorders, and the like, use a record head oscillator circuit biased at a relatively high frequency (well out of the audible range). For example, a bias frequency circuit for cassette tape recorders may have a frequency of around 100–120 KHz. Such a bias oscillator circuit is required, as those skilled in the art will recognize, if a quality analog source signal is to be properly recorded on the tape. It is this bias oscillator circuit, or more accurately the signals of this bias oscillator circuit, with which the subject degrade signal interacts to generate harmonics or a beat frequency that is recorded on the copied tape along with the source material, thereby distorting the recorded material. On playback, the playback heads reproduce this distortion and the listener hears objectionable and unacceptable sounds along with the source material. On playback of videotape, the degrade signal may also cause the audio signal to be out of synchronization with the video signal which makes the recorded copy even more unacceptable.

Figure 2:
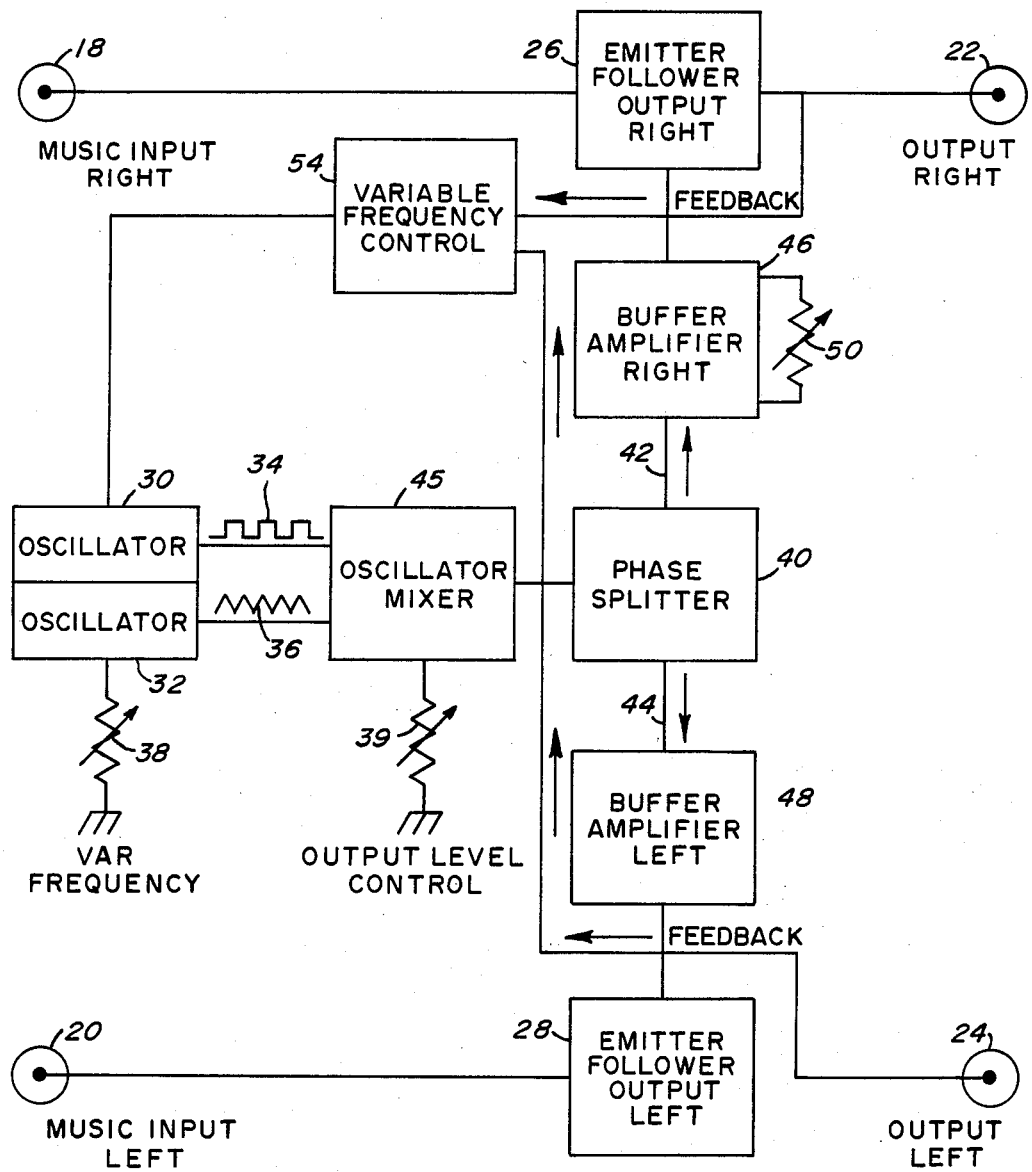
FIG. 2 is a block diagram illustrating the operation of one degrade signal circuit.

One embodiment of the degrade signal circuit is shown in greater detail in FIG. 2. Terminals 18 and 20 are inputs from the audio source material 10. The circuits shown are for stereo recordings; and for monaural recordings, of course, only one channel would be used. The audio source material input to terminals 18 and 20 is coupled to output terminals 22 and 24 for connection to record heads 16 by coupling circuits 26 and 28, which are emitter follower output stages. The record heads 16 could either be cutting heads for making a phonograph record or they could be magnetic recording heads for making a master tape. The degrade signal is generated by voltage controlled oscillators (VCO) 30 and 32, which provide square wave and triangular wave output signals respectively, as indicated at 34 and 36. These output signals from the oscillators have adjustments provided by potentiometer 38 to vary the respective frequency outputs which will be described in greater detail hereinafter. The output signals 34 and 36 are mixed at amplitude ratios of between 4 to 1 by the oscillating mixing stage 45. The output level of the oscillating mixing stage is controlled by potentiometer 39. For the stereo source material, the output of the mixing stage 45 is fed to a phase splitter 40 for splitting into positive and negative output signals on lines 42 and 44. The degrade signal is then fed to buffer stages 46 and 48 for coupling with the source material in emitter follower coupling stages 26 and 28. A calibrate control 50 is provided to adjust the output balance of the two signals, if desired.

The variable frequency control 54 provides feedback from the summed outputs of the emitter follower coupling circuits 26 and 28 to the voltage control oscillating circuits 30 and 32 to vary the frequency of the oscillators according to the output level of the source material. The variable frequency control 54 varies the output frequency continuously from the frequency preselected by potentiometer and other circuits which will be described hereinafter.

As was stated previously, the VCO oscillators provide output signals which, when mixed, will provide a degrade signal in the range desired.

The method of the invention allows combining of the degrade signal along with the source material to a record or write head and recorded in the record groove or on a tape. With the method of the present invention, the high frequency mixed signal will be recorded along with the source material. If an attempt is made to copy the original recording on a magnetic recording device, the high frequency degrade signal will interact with the bias oscillator signal of the magnetic recording head to produce a distortion signal (an audible harmonic signal) in the copied material, creating an uncomfortable output for the listener. The listener will typically not notice the degradation upon making a recording until he tries to play the recording back, unless he is on tape monitor during the recording process. When in the tape monitor mode or when listening to a replay of a taped copy, a distinct output distortion is heard which may sound like an unpleasant wavering of the combined source material or a distinct high pitched howl along with the source material.

As explained above, it is believed that the distorted output recorded from the original recording is caused because the high frequency degrade signal combined with the original source signal generates harmonic signals that distort second generation recordings of the originally recorded source material. For the embodiment shown in FIG. 2, the type of distortion can be varied by varying the frequency of the variable control oscillators 30 and 32 through potentiometer 38.

Figure 3:
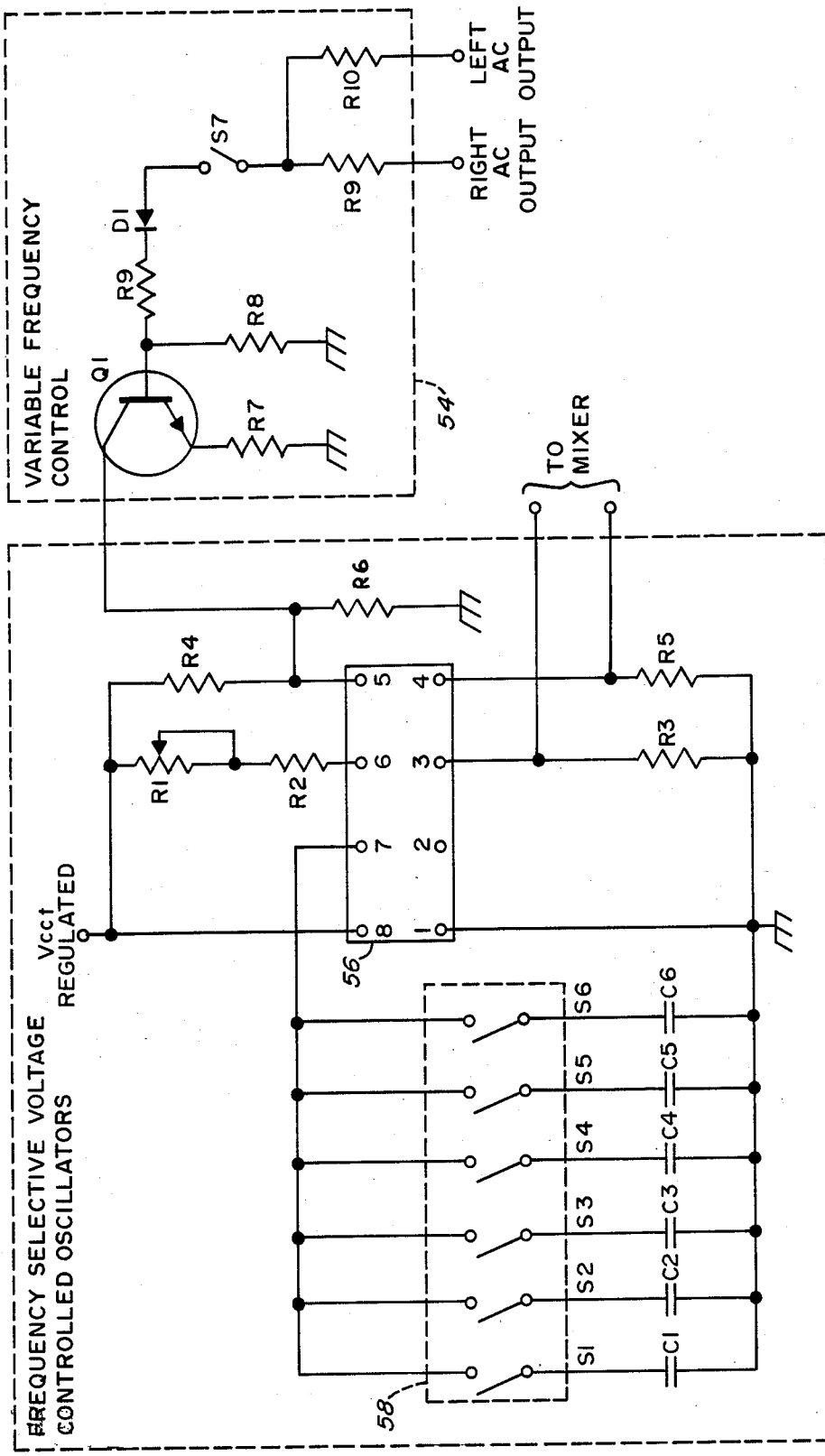
FIG. 3 is a schematic diagram of the oscillating and feedback circuits of FIG. 2.

The voltage control oscillators 30 and 32 (FIG. 2) can provide signal outputs in frequency ranges up to 1 megahertz as selected by various controls. These controls are shown in FIG. 3. The voltage control oscillators may be on a single chip 56 with the frequency outputs controlled by several means. The first of these means is a coding switch 58 by which one or more of capacitors labelled C1 through C6 may be selected to vary the frequency outputs on pins 3 and 4 of the voltage control oscillator chip 56. For example, with values of the capacitors C1 through C6 being selected to be in the range of 0.01 microfarads (uf), 330 picoparads (pf), and up to 680 pf, a variety of fixed frequencies can be selected. As examples, with switch positions 1 through 4 closed, the voltage control oscillator may provide an output frequency of 20 KHz while with switch positions 2, 3 and 4 closed a frequency output of 50 KHz could be provided; or with switch 5 closed the frequency output may be 180 KHz. By simply expanding the number of capacitors and number of switch positions, numerous frequencies can be selected to provide a desired frequency for a particular application.

Additional frequency control is provided by potentiometer R1 for varying the fixed frequency selected by coding switch 58 over a wide range. Thus, with a frequency of 50 KHz selected by coding switch 58, potentiometer R1 may select frequencies between 25 KHz and 75 KHz. In this manner, the output of the variable control oscillators may be calibrated to provide a particular predetermined frequency band around the fixed frequency selected by the coding switch 58.

The feedback circuit 54 also provides variable frequency control to make it difficult to determine just the frequency of the degrade signal being provided, in order to prevent subsequent filtering of the degrade signal. Resistors R9 and R10 of the feedback circuit are connected to the right and left AC output respectively, summed, and then fed through switch S7 to transistor Q1 after being rectified by diode D1. The output collector of transistor Q1 is connected to the biasing input, pin 5, of the voltage control oscillator chip 56. As the source material output varies, Q1 will switch on and off depending upon the amplitude of the output, providing a variation on the biasing to the voltage control oscillators in chip 56. Thus, the frequency of the degrade signal will vary depending upon the output level of the source material. Thus, when there is an audio signal being fed to the output terminal, the frequency will vary according to the feedback provided by this output. Advantageously, chip 56 may be realized with a commercially available part, NS556, manufactured by National Semiconductor. When there is no output, transistor Q1 will not turn on and the frequency being recorded, for example between cuts on a record, will be the fixed frequency set by the potentiometer R1 and the coding switch 58. That is, resistors R9 and R10 provide a summed signal to switch S7 when there is an output. There will be little or no signal when there is no output and therefore no feedback signal to turn on transistor Q1. If it is preferred to keep the degrade signal at some constant frequency, switch S7 is provided to switch the variable frequency control feedback circuit 54 off.

To illustrate the operation of the invention, assume the frequency of the bias oscillator of the tape recorder used to make a copy of the original recording is about 120 KHz, a typical value for many common cassette and eight track tape recorders. The base frequency of the degrade signal could then be selected to be around 100–105 KHz. When the copied tape is made, harmonics would therefore be generated in the 15–20 KHz range (the difference between the two frequencies), well within the audible range of most humans. These harmonics would be heard during playback of the copied tape, therefore making the quality of the copied tape inferior. Alternatively, the base frequency of the degrade signal could be selected to be much closer to the bias oscillator frequency, thereby creating harmonics even lower in the audible range (5–10 KHz). This might be especially appropriate if the original source material is speech, as opposed to music, where the frequencies of the spoken material would rarely exceed a few KHz. Depending upon the particular equipment used, including the anticipated equipment that might be used to make a copy, some experimentation might be needed in order to optimize the setting of the base frequency of the degrade signal.

Figure 4A:
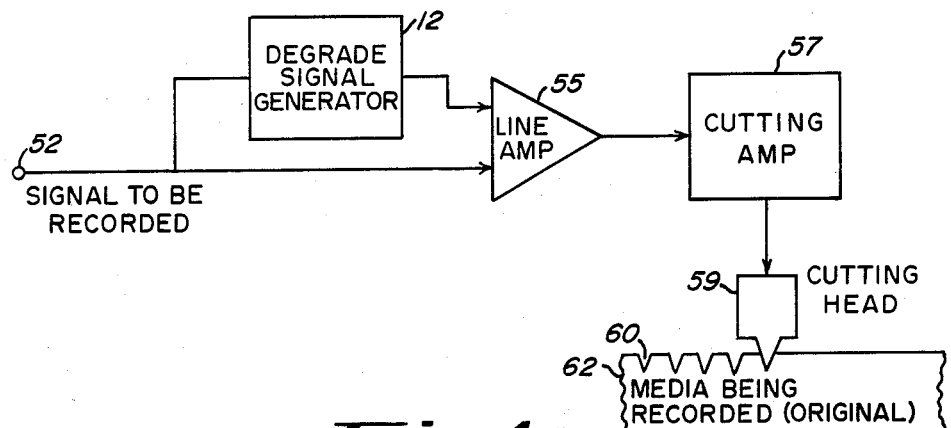
FIGS. 4A–4d are simplified block diagrams that illustrate, respectively, the use of the present invention to make an original record, the playback of such an original record, an attempt to copy the original record on a magnetic tape, and the playback of such a copy.

This process of using the invention to preclude the acceptable copying of original source material is further illustrated in the simplified block diagrams of FIGS. 4a–4d. In FIG. 4a, the making of an original sound recording on a record or disc for use with a high fidelity phonograph or turntable is shown. The signal to be recorded is presented at an input port 52. This signal may or may not be coupled to the degrade signal generator or circuit 12 depending upon the particular configuration of the invention that is used. The degrade signal can be continuously combined with the source signal or the degrade signal can be keyed off of the source signal such that the degrade signal is combined with the source signal only when a desired parameter of the source signal exceeds a specified threshold level. The degrade signal is combined with the source signal in a line amplifier 55 (which line amplifier is equivalent to the coupling circuit 14 of FIG. 1). The output of the line amplifier is directed to a cutting amplifier 57, which cutting amplifier generates the control signals for a cutting head 59. The cutting head 59 selectively cuts a continuous, spiraling, V-shaped groove 60 in moving (typically rotating) media 62, which groove 60 has a cross-sectional width that varies as a function of the signal being recorded. In the case of recording stereophonic or two channel, signals, one side of the groove 60 is modulated by the signal from a first channel, e.g., the right channel; and the other side of the groove is modulated by the signal from the other channel, e.g., the left channel. In accordance with the present invention, the sides of the V-groove 60 cut into the media 62 are modulated as a function of the combined signal comprising the degrade signal and source signal as combined in the line amplifier 55.

Figure 4B:
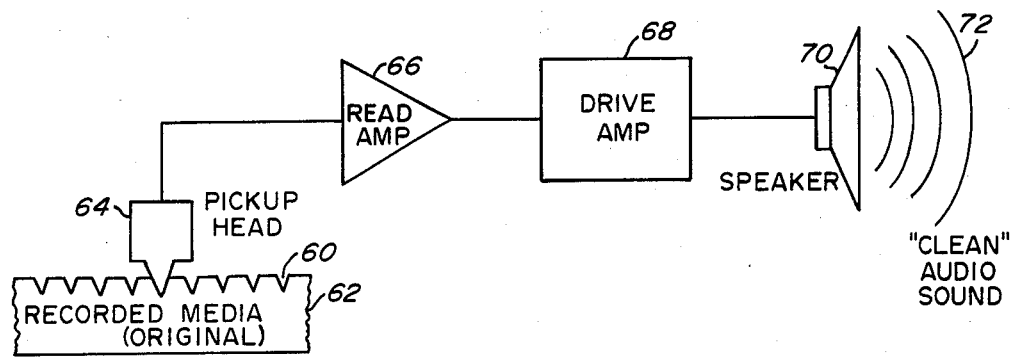

FIG. 4b illustrates the playback process associated with listening to material recorded on the media 62. According to well known principles, a pickup or read head 64 senses the modulations placed in the groove 60, as the media 62 passes thereunder. A read signal is thus generated that is amplified in a read amplifier 66 and presented to a drive amplifier 68, which drive amplifier delivers the signal to a speaker 70 or equivalent transducer that converts the signal to an audio signal 72. The presence of the degrade signal is not sensed, however, by a listener to the original recording because the frequency of the degrade signal is either above the normal hearing range of humans or is filtered out by the bandwith of the read channel (pickup head 64, read amplifier 66, drive amplifier 68, and speaker 70). Thus the audio sound 72 is perceived as "clean", or of acceptable quality.

Figure 4C:
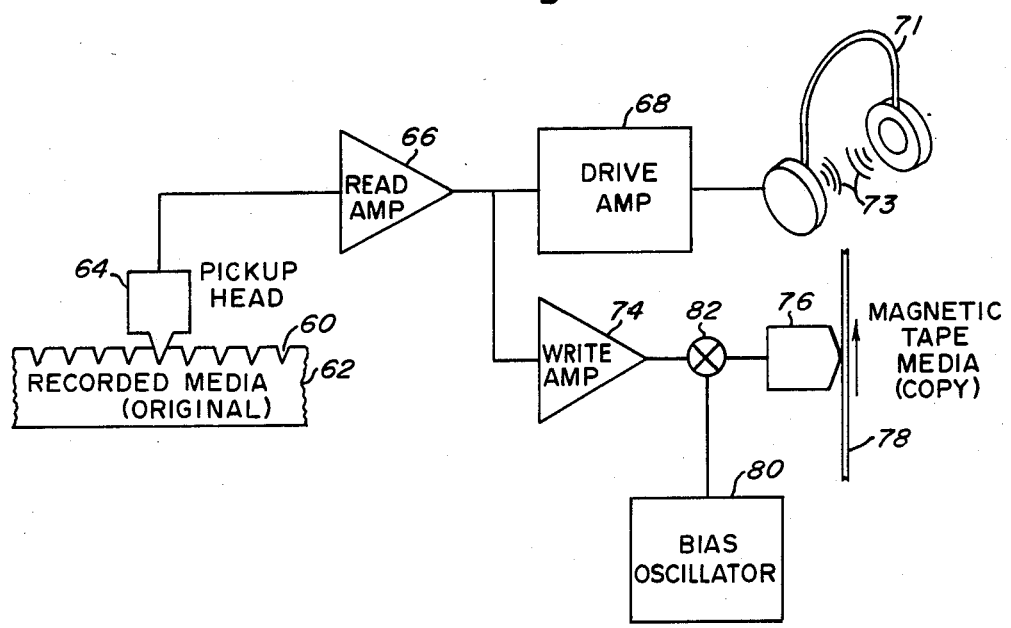
Figure 4D:
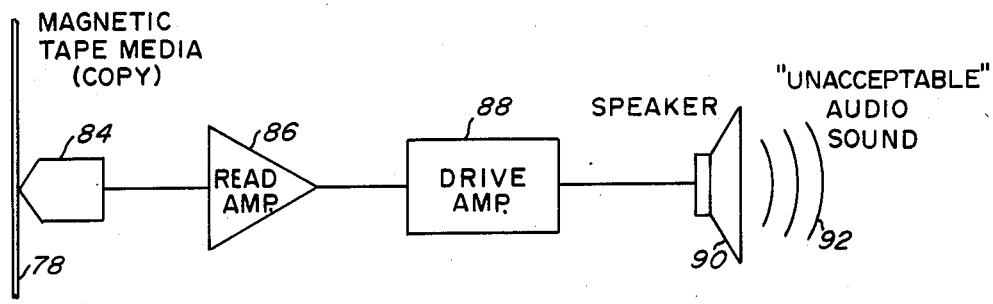

In FIGS. 4c and 4d there is illustrated, in simplified form, the results of copying the original recording onto another media, such as a tape. In FIG. 4c, a copy of the original recorded media is made. This is done by playing back the original recorded media 62 through a read channel comprising the pickup head 64, the read amplifier 66, a drive amplifier 68, and a set of monitoring earphones 71. "Clean" audio sound 73 may be heard through the earphones 71 for the same reasons that "clean" audio sound is heard from the speaker 70 in FIG. 4b. The read signal from the read amplifier 66 is also directed to a write or record amplifier 74. The purpose of the write amplifier 74 is to buffer and condition the signal prior to presenting it to a recording head 76, which recording head 76 converts the signal to equivalent magnetic fluxes that are stored on a magnetic tape 78 or other magnetic media being moved past the head 76.

In order to ensure that the magnetic flux signal is properly biased as it is recorded on the tape media 78, that is in order to prevent undesirable signal offset from accumulating that may cause the peaks of the signal to be clipped off, it is necessary to bias the magnetic recording head 76 with a high frequency signal from a bias oscillator circuit 80. This is typically done by injecting the high frequency bias oscillator signal into the magnetic recording head 76 along with the signal to be recorded. The combining of these two signals, the bias oscillator signal and the signal to be recorded, results, as least partially, in a mixing or multiplying action between the two signals. This mixing action is symbolically depicted in FIG. 4c by the multiplier element 82. It is to be emphasized that the mixing or multiplier element 82 is not a separate circuit that is designed into the write or record channels. Rather, it functionally represents what happens when two relatively high frequency signals (near the upper end of or beyond audible range) are combined in most electronic applications.

As those skilled in the art will recognize, the mixing of two signals causes the two signals to beat against each other so as to produce resultant signals having frequencies that are the sum and difference frequencies of the signals being mixed or multiplied. These resultant signals, often referred to as harmonics, are used extensively in the art for a variety of purposes. It is the generation of such harmonics, for example, that make radio frequency communications possible. That is, very high frequency signals must be used in order to allow the signals to propogate through space as radio waves. When received through an antenna at a receiver, however, these very high frequency signals are difficult to process. Therefore, these signals are "mixed" with an oscillator signal in order to convert them to a lower frequency signal, which lower frequency signal has a frequency equal to the difference between the oscillator frequency and the very high radio frequency signal.

Still referring to FIG. 4c, the bias oscillator signal interacts with the signal to be recorded at the mixing element 82 so as to create harmonics or beat frequency signals. Some of these harmonics, those representing the difference between the bias oscillator frequency and the degrade signal, will fall within the audible range and will be recorded on the magnetic media 78 along with the desired signal.

During playback of the copied tape, as depicted in FIG. 4d, the magnetic media 78 is passed by a read head 84. In practice, the write or record head 76 may be the same head as the read head 84. The read head 84 magnetically senses the information stored on the magnetic tape and generates a read signal as a function of the stored information. This read signal is processed through a read channel comprising a read amplifier 86, a drive amplifier 88, and a speaker 90. The audio sound 92 produced by the speaker 90 is of unacceptable quality, however, because of the audible harmonics that were recorded on the tape media 78 along with the copied source material (FIG. 4c).

It is to be emphasized that while FIGS. 4a–4d illustrate the operating principles of the present invention in the context of an original recording made on a record or disc of the type used with high performance phonographs or turntables, which is one of the preferred applications of the invention, the invention is not intended to be so limited. Almost any type of media, both known and yet to be conceived, could be used to store the original source material. In those instances where the original media is magnetic media, such as magnetic tape (cassette, eight-track, or video), and wherein a bias oscillator circuit must be used with the write (record) circuits in producing the original recording, some care will have to be exercised in selecting the frequency of the degrade signal so that objectionable audible harmonics are not recorded along with the desired source material on the original recording. As explained herein, means are provided for selecting this frequency so that such objectionable harmonics may be avoided or minimized.

Further, the invention is not limited to sound recordings. Digital recordings of the type wherein a desired digital pattern is represented by a tone burst (which tone burst is nothing more than an analog signal at a set audible frequency) may also be protected by the present invention. Such recordings are commonly used to store digital data on cassette tapes, which cassette tapes are designed for use on audio cassette recorders.

As described, the present invention may be utilized when: (1) the source signal to be recorded is an analog signal (such as music, speech, tone bursts, etc.); and (2) the recording apparatus upon which a copy is made is of a type that employs a bias oscillator, or equivalent, so that a harmonic-generating mechanism is provided that makes listening to or playing back the copied recording objectionable. These two conditions are actually closely related, as those skilled in the art will recognize, because it is analog signals with which a bias oscillator must be used in order to make a quality magnetic recording thereof.

Figure 5:
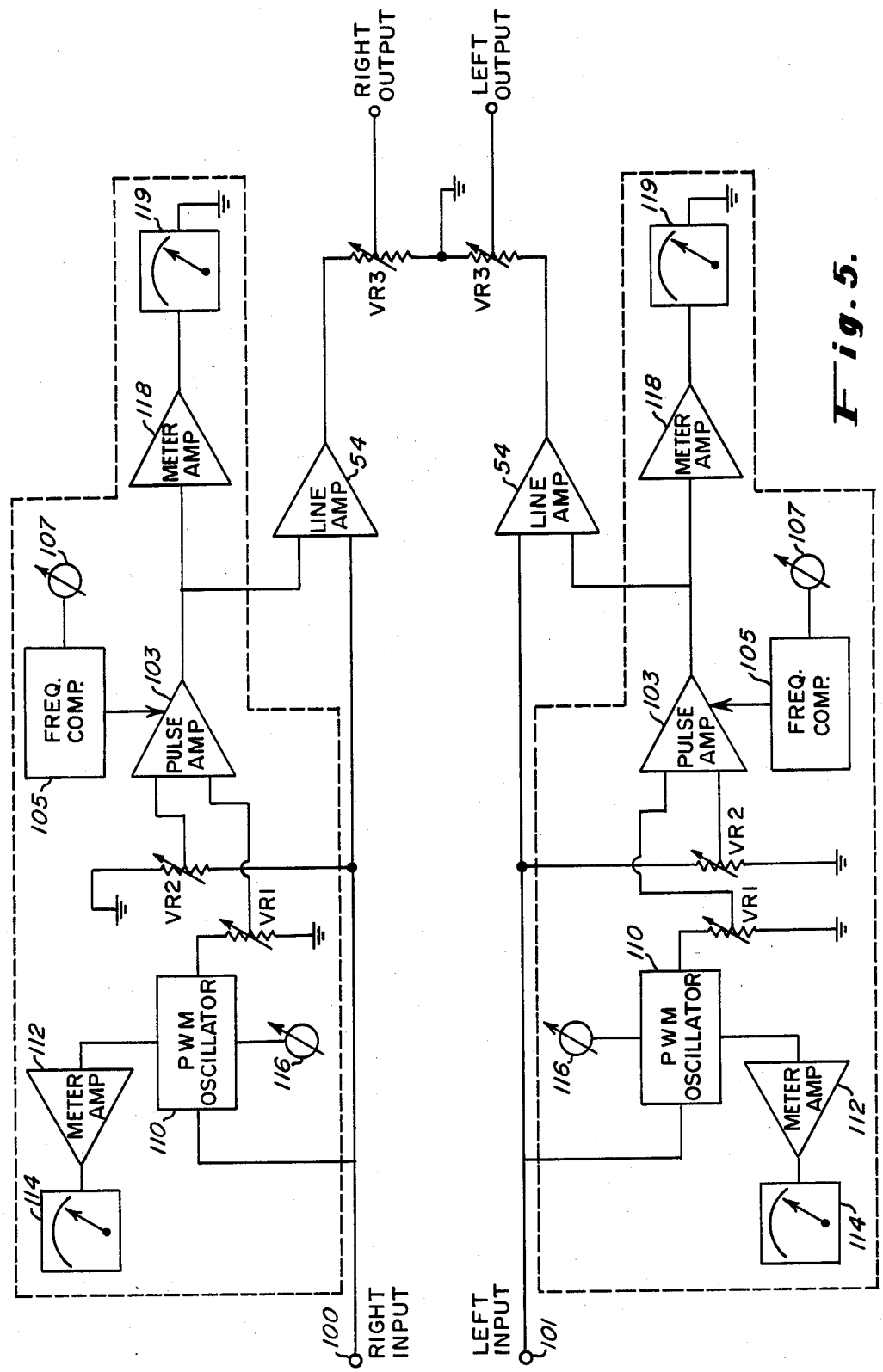
FIG. 5 is a block diagram illustrating the operation of an alternative degrade signal circuit as used to generate a degrade signal for the respective channels of a stereophonic source signal.

Referring next to FIG. 5, there is shown an alternative embodiment of a degrade signal generator 12 that utilizes a pulse width modulator (PWM) circuit as opposed to a voltage controlled oscillator. Actually, FIG. 5 represents the use of two degrade signal generators, one for each channel of a stereophonic system. The only difference between the two channels is the setting of the base operating frequency of the PWM circuits. In a preferred stereophonic application, for example, the right channel PWM circuit may be set to a base frequency of 18.5 KHz, and the left channel PWM circuit may be set to a base frequency of 17.9 KHz. This slight difference in base frequencies creates an even more objectionable beat frequency between the undesirable harmonics of the copied tape so as to further degrade the quality thereof.

In FIG. 5, the original source signal is applied to an input terminal 100 (right) or 101 (left) and delivered to one input of the line amplifier 54. The other input to the line amplifier is from a pulse amplifier 103, which pulse amplifier generates the degrade signal as a function of the output signal generated by a PWM oscillator circuit 110. A first meter amplifier 112, and corresponding meter 114, allows the output level of the PWM output to be monitored and adjusted, as needed, to a safe level, one that prevents clipping of the oscillator signal or overdrive of the pulse amplifier 103. Adjustments in the output level may be provided by variable resistor VR1, or equivalents thereof. Manual frequency adjustment means 116 are also provided that allow the base operating frequency of the PWM oscillator 110 toi be selectively adjusted.

As those skilled in the art will recognize, a PWM oscillator circuit is one in which an output signal, typically a square wave, or a pulse train having fixed width pulses, is generated in the absence of a modulating signal. The frequency of this square wave or pulse train in the absence of a modulating signal is referred to as the base or operating frequency. It is this base frequency that may be selected by the manual adjustment means 116.

A modulating signal causes the width of the square wave or other pulse to vary. In the embodiment shown in FIG. 5, the frequency of the modulating signal, which modulation signal is the original source signal to be recorded, determines the width of the pulses generated by the PWM oscillator circuit 110. Lower frequencies cause the width of the pulses to become wider, and higher frequencies cause the width of the pulses to become narrower.

For the configuration shown in FIG. 5, the output of the PWM oscillator is passed through the pulse amplifier 103 and combined with the source signal in the line amplifier 54. Hence, the degrade signal is really derived from the PWM oscillator signal. However, as will be more apparent from the discussion that follows, the pulse amplifier 103 effectively acts as a switch, allowing the PWM output signal to be passed therethrough and added to the source signal only when the frequency of the source signal is above a desired level.

Still referring to FIG. 5, the pulse amplifier 103 utilizes frequency compensation means 105 therewith that allows the trigger level of the pulse amplifier, that point at which it is turned on so as to act like a closed switch, to be set a desired frequency. This frequency compensation 105 is adjustable by means of manual adjustment means 107. The "trigger signal" applied to the pulse amplifier 103, that signal whose frequency is examined to determine if the pulse amplifier is to be turned on or off, is the original source signal. The level or amplitude of this source signal applied to the pulse amplifier 103 may be selectively adjusted by means of variable resistor VR2, or equivalent. A second meter amplifier 118, and corresponding meter 119, allow the output frequency of the pulse amplifier to be monitored so that the recording head (FIGS. 1 or 4a) used in the recording system does not overheat due to high frequency pulse rates. The actual level (amplitude) of the combined signal delivered to the recording heads may be controlled by means of variable resistor VR3, or equivalent, placed in series with the output on the line amplifier 54.

Figure 6:
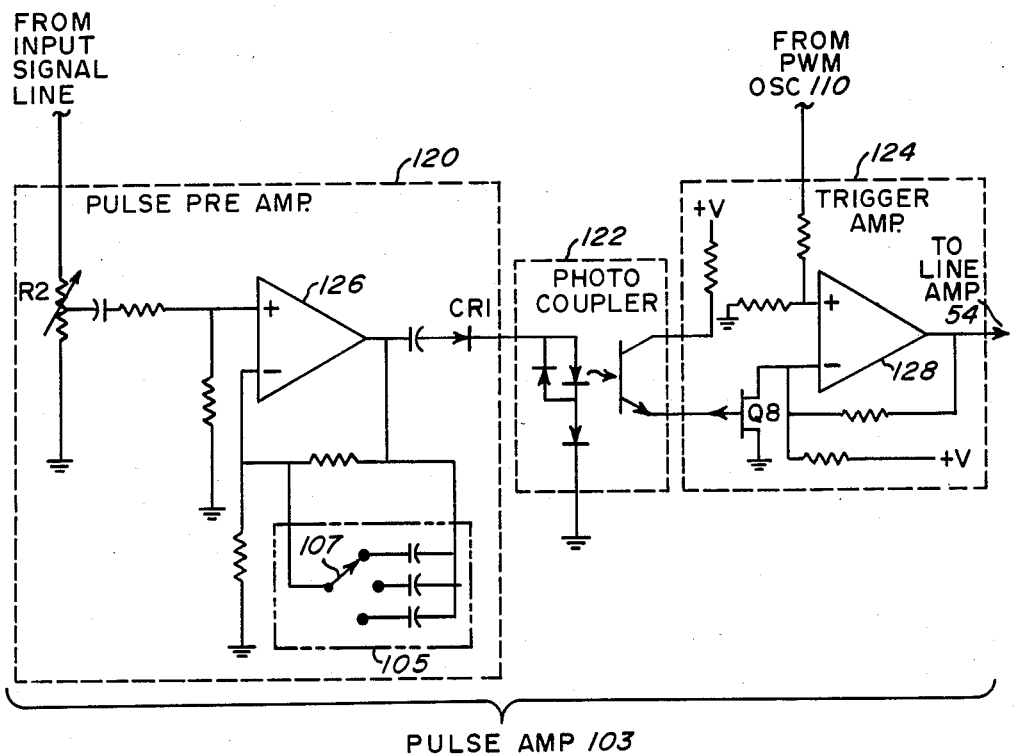
FIG. 6 is a schematic diagram of one configuration of the pulse amplifier of FIG. 5.

Referring next to FIG. 6, there is shown a schematic diagram of one possible embodiment of the pulse amplifier 103 of FIG. 5. As is seen in FIG. 6, the pulse amplifier 103 comprises a pre-amplifier circuit 120, a photo coupler circuit 122, and a trigger amplifier circuit 124.

The pre-amplifier circuit 120 includes an amplifier 126 that buffers and amplifies the input source signal. The frequency compensation 105, connected in the feedback loop of the amplifier 126, causes the amplifier 126, in cooperation with the compensation circuitry 105, to function as a selective high pass filter. The diode CR1 rectifies that output of this high pass filter so that positive peaks thereof may trigger the photo coupler 122. Once the photo coupler turns on, FET transistor Q8 of the trigger amplifier is likewise turned on, which action enables or turns on amplifier 128 so that the PWM oscillator signal may be passed through amplifier 128 and directed to the line amplifier 54. For simplicity, some of the biasing circuitry associated with the operation of amplifier 128 has not been shown in FIG. 6, however, those skilled in the art would readily be able to bias the amplifier so that it would function in the desired manner.

Figure 7:
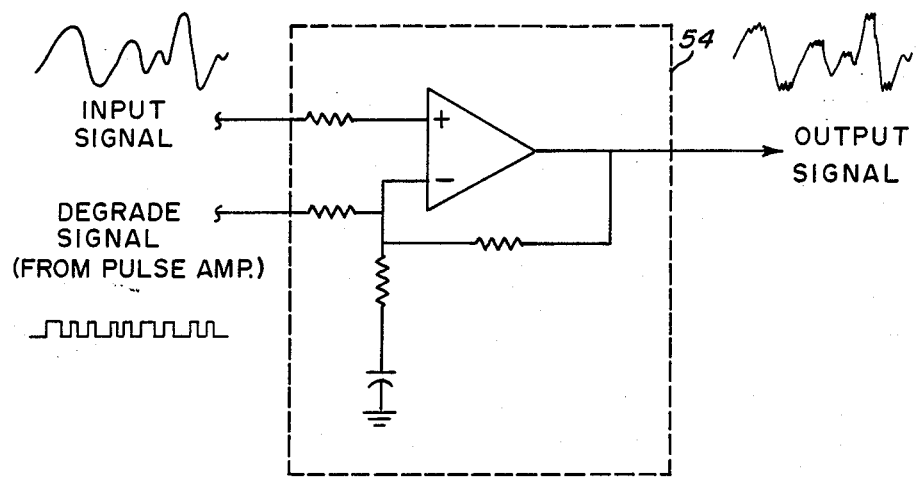
FIG. 7 is a simplified block diagram that illustrates the operation of the line amplifier of FIG. 5.

Referring next to FIG. 7, a simplified diagram on the line amplifier 54 is shown. This diagram is presented to help explain the function of the line amplifier. The line amplifier is essentially a summing circuit. The source input signal is connected to one input port thereof, and the degrade signal (which is the PWM oscillator 110 output switched or coded on and off by the pulse amplifier 103) is connected to the other input port thereof. These signals are summed together, producing an output signal that is the combination thereof. In practice, the gain of the line amplifier 54 for the input source signal will be different than the gain for the degrade signal. It is to be noted that the signal waveforms depicted in FIG. 7 for the input signal are not drawn to the same time scale. The degrade signal typically has much higher frequencies associated therewith than the primary frequency components of the input source signal. Thus, in the output signal waveform, also depicted in FIG. 7, the degrade signal may appear as bursts of high frequency pulses riding on the higher frequency components of the source signal.

Figure 8:
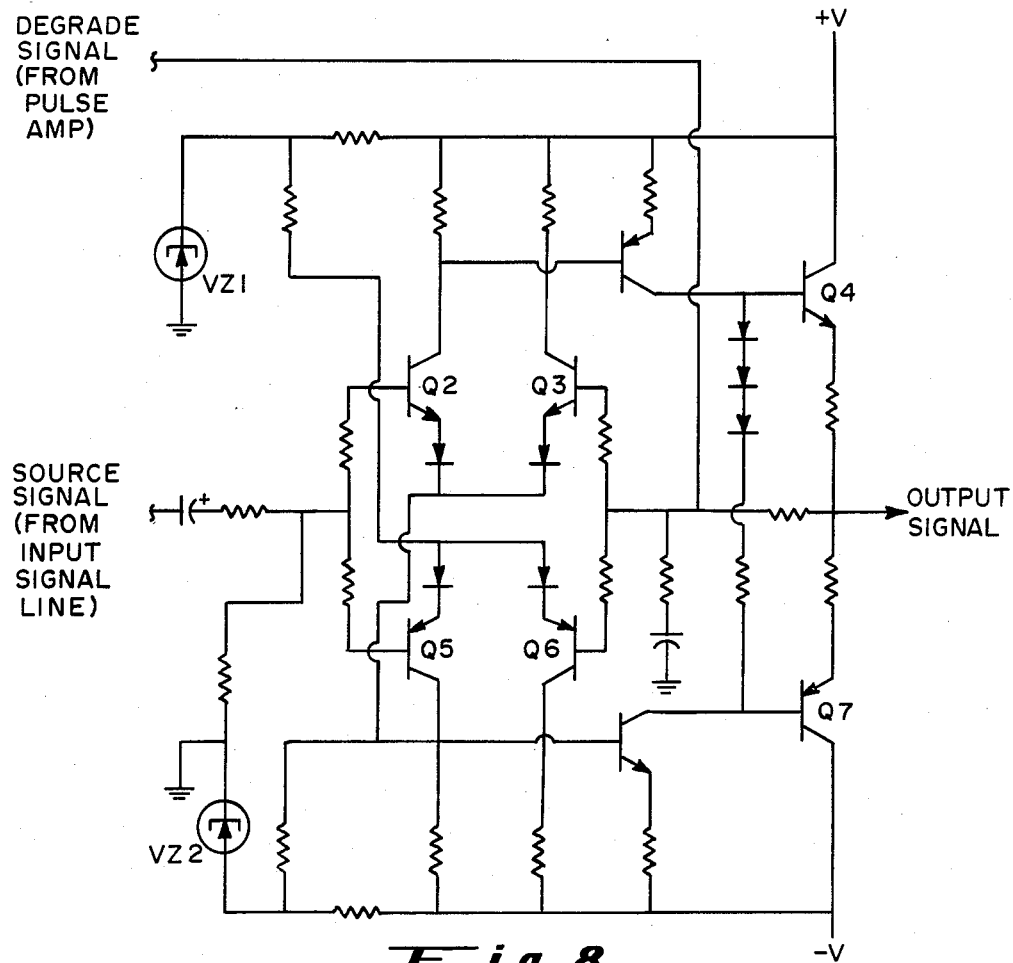
FIG. 8 is a schematic diagram of a preferred embodiment of the line amplifier of FIG. 5.

Referring next to FIG. 8, a schematic diagram of a preferred embodiment of the line amplifier 54 is shown. The configuration shown in FIG. 8 is realized using discrete components. Discrete components are used in the preferred embodiment in lieu of an integrated circuit linear amplifier in order to make sure stray currents do not enter the cutting head system and damage it. For the configuration shown in FIG. 8, the supply voltages are +15 volts and −15 volts. The diodes VZ1 and VZ2 are high voltage tunnel diodes with a high voltage breakdown. NPN input transistors Q2 and Q3 may be realized using MPS 8099 transistors, and the output NPN drive transistor Q4 may be realized using an RCA 2N3440 transistor. PNP input transistors Q5 and Q6 may be realized using MPS 8599 transistors, and the output PNP drive transistor Q7 may be an RCA 2N5416 transistor. Other components associated with the discrete circuit of FIG. 8 may be readily determined by those skilled in the art. All of the components required to realize the circuit of FIG. 8 are available commercially from numerous manufacturers.

Any suitable commercially available linear operational amplifier may be used to realize the amplifiers 126 and 128 of the pulse amplifier 103 (FIG. 6). The photo coupler 122 may be a GE H11AA1 device, manufactured by General Electric Company.

Those skilled in electronic art will realize that numerous types of circuits could be used to realize the PWM oscillator circuit 110. Applicant has successfully used a CA1524 switching power supply integrated circuit, manufactured by RCA, as the primary component for the PWM circuit 110. Bias and control circuits needed with the CA1524 device in order to use it as a PWM circuit are well described in the literature, or are easily ascertainable. Accordingly, such details will not be repeated herein.

Should the original source material be digital data having a specified tone burst for a known data sequence, then some means must be used to randomly combine the degrade signal with the source signal. Applicant has found that a signal generator set to a very low ramping frequency pulse mode of between 0.1 Hz and 5 Hz can be used to trigger the pulse amplifier so that a suitable high frequency degrade signal (e.g., one having a frequency that is also randomly varied) can be randomly combined with the source tone bursts.

Obviously, many variations of the invention are possible within the light of the teachings presented herein, and the invention is not to be limited to the embodiments shown in the drawings and described in the description which are given by way of example and not of limitation. It is intended, therefore, that the scope of this invention be defined in accordance with the scope of the appended claims.

What is claimed is:

1. A system for preventing the copying of original recordings comprising:
   means for generating a source material signal;
   means for creating a degrade signal which will degrade any source material recorded from an original recording thereof, including a pair of oscillating means and mixing
   means connected to said oscillating means for mixing the outputs of said oscillating means;
   means for combining the degrade signal with the source material signal to produce a combined signal; and
   means for recording said combined signal on said original recording.

2. The system according to claim 1 in which said pair of oscillating means comprises a pair of voltage controlled oscillators.

3. The system according to claim 1 in which one of said pair of oscillators generates a square wave and the other of said oscillators generates a triangular wave.

4. The system according to claim 1 in which the frequency of the degrade signal is above seventeen kilohertz.

5. The system according to claim 1 in which the frequency of the degrade signal is above fifty kilohertz.

6. The system according to claim 5 in which the frequency of the degrade signal is between fifty kilohertz and seventy-five kilohertz.

7. The system according to claim 1 in which the means for combining the degrade signal with the source material signal includes means for combining the degrade signal in two channels.

8. The system according to claim 7 in which said means for combining the degrade signal in two channels comprises:
   phase splitting means for splitting the degrade signal into two components.

9. The system according to claim 8 in which said pair of oscillating means comprises one oscillator for generating a square wave and another oscillator for generating a triangular wave.

10. The system according to claim 9 including means for varying the frequency output of said pair of oscillating means.

11. The system according to claim 9 including means for varying the output level of said mixing means.

12. The system according to claim 10 in which the means for varying the frequency includes:
    a plurality of parallel connected capacitors; and
    switching means for selectively switching said capacitors in and out of the circuit with said pair of oscillating means whereby the frequency output can be selectively varied.

13. The system according to claim 12 including a potentiometer for varying the frequency output around the preselected frequency.

14. The system according to claim 10 further including:
    feedback means, said feedback means being connected to control the output signal of said oscillators according to variations at the output of said oscillators.

15. The system according to claim 14 in which said feedback means includes means for summing a pair of outputs.

16. The system according to claim 15 in which said summed outputs are connected through transistor switching means to vary the bias on said pair of oscillators thereby varying the frequency output.

17. The system according to claim 14 including switch means for switching said feedback means in and out of the circuit to said pair of oscillators.

18. A system for preventing the copying of original recordings comprising:
    means for generating a source material signal;
    means for creating a degrade signal which will degrade any source material recorded from an original recording thereof, including a pulse width modulation (PWM) oscillator circuit for generating a pulsed output signal having variable pulse widths in response to a modulation signal;
    means for combining the degrade signal with the source material signal to produce a combined signal; and
    means for recording said combined signal on said original recording.

19. The system as defined in claim 18 wherein said means for creating a degrade signal further comprises:
    pulse amplifier means interposed between said PWM oscillator circuit and said combining means for conditioning said pulsed output signal prior to combining it with the source material signal.

20. The system as defined in claim 19 wherein said pulse amplifier means comprises:
    a pre-amplifier circuit for generating a trigger signal only when a desired performance parameter of said source material signal exceeds a specified threshold; and
    a trigger amplifier circuit responsive to said trigger signal for coupling said pulsed output signal of said PWM oscillator circuit to said combining means when said trigger signal is generated, and for decoupling said pulsed output signal from said combining means when said trigger signal is not generated.

21. The system as defined in claim 20 wherein said desired performance parameter of the source material signal is its frequency.

22. The system as defined in claim 20 wherein said pulse amplifier means further comprises photo coupler means interposed between said pre-amplifier circuit and said trigger amplifier circuit for coupling said trigger signal from said pre-amplifier circuit to said trigger amplifier circuit.

23. The system as defined in claim 18 wherein said modulation signal applied to said PWM circuit comprises said source material signal.

24. The system as defined in claim 18 wherein said combining means comprises a linear amplifier that sums said source material signal and said degrade signal.

25. The system as defined in claim 24 wherein said linear amplifier is realized with discrete components.

26. The sytem as defined in claim 24 wherein said linear amplifier further comprises means for selectively adjusting the signal level of the output signal generated by said linear amplifier prior to recording it on said original recording.

27. The system as defined in claim 18 wherein the frequency of said degrade signal is selected to fall within a range that will interact with a bias oscillator signal of a recording device used to record a copy of said original recording, said signal interaction causing harmonic signals to be generated that, when played back from the recorded copy, produce objectionable results that unacceptably degrade the quality of said recorded copy.

28. The system as defined in claim 27 wherein said original recording is recorded on a disc adapted to be rotated on a turntable, and wherein said source material is recorded thereon by selectively varying the shape of a spiraling V-groove cut thereinto.

29. The system as defined in claim 28 wherein said recording device used to make a copy of said original recording comprises a magnetic recording device, such as a cassette tape recorder, an eight track tape recorder, a reel-to-reel tape recorder, or a recorder circuit used to record the audio track of a video tape.

30. The system as defined in claim 27 wherein the low end of the selected frequency range of said degrade signal begins at about 17.0 KHz.

31. An anti-copy system comprising:
means for generating a degrade signal;
means for combining said degrade signal with a source signal to produce a combined signal; and
means for recording said combined signal on an original recording;
said degrade signal having one or more frequencies selected to mix with the oscillator signals associated with the recording circuits of magnetic media recording devices so as to generate harmonic or beat frequency signals, the presence of said harmonic signals causing the source signals recorded on the magnetic media to be unacceptably distorted and degraded.

32. The anti-copy system as defined in claim 31 wherein said degrade signal generation means comprises:

pulse modulation (PWM) circuit means for generating a pulsed output signal having pulse widths that vary in response to said source signal; and
triggering means for selectively keying said pulsed output signal so that it is enabled or disabled depending upon whether a trigger signal is present or not;
whereby said degrade signal comprises a series of signal bursts, each burst comprising a segment of said pulsed output signal from said PWM circuit, and each burst being separated in time from adjacent bursts as controlled by said trigger signal.

33. The anti-copy system as defined in claim 32 wherein said trigger signal is generated whenever a specified parameter of said source signal exceeds a specified threshold.

34. The anti-copy system as defined in claim 33 wherein said specified parameter is the frequency of said source signal.

35. An anti-copy device comprising:
means for generating a degrade signal having one or more frequencies selected to mix with the oscillator signals associated with the recording circuits of magnetic media recording devices so as to generate harmonic or beat frequency signals; and
means for combining said degrade signal with a source signal to produce a combined signal.

36. The anti-copy device as defined in claim 35 wherein said degrade signal generation means comprises:
pulse width modulation (PWM) circuit means for generating a pulsed output signal having pulse widths that vary in response to said source signal; and
triggering means for selectively keying said pulsed output signal so that it is enabled or disabled depending upon whether a trigger signal is present or not;
whereby said degrade signal comprises a series of signal bursts, each burst comprising a segment of said pulsed output signal from said PWM circuit, and each burst being separated in time from adjacent bursts as controlled by said trigger signal.

37. The anti-copy device as defined in claim 36 wherein said trigger signal is generated whenever a specified parameter of said source signal exceeds a specified threshold.

38. The anti-copy device as defined in claim 37 wherein said specified parameter is the frequency of said source signal.

39. A method of making an original recording from which acceptable copies cannot be made using conventional recording devices, said method comprising the steps of:
(a) generating a source signal representative of the original source material to be recorded;
(b) generating a degrade signal having frequencies high enough to be substantially unnoticeable upon playback of said original recording;
(c) combining said source signal with said degrade signal to form a combined signal; and
(d) recording said combined signal on said original recording, one or more frequencies of said degrade signal having a value such that when mixed with a bias oscillator signal associated with a recording device used to copy said original recording, harmonic signals are generated that significantly and objectionably degrade the quality of the copied recording.

40. The method of claim 39 wherein step (b) comprises:
(1) generating a pulse width modulated (PWM) signal comprising a series of pulses having variable widths, said widths being a function of a modulation signal, and
(2) keying said PWM signal off of a trigger signal such that said PWM signal is enabled when said trigger signal is present and disabled when said trigger signal is not present, whereby said degrade signal comprises a series of signal bursts, each burst comprising a segment of said PWM signal, and each burst being separated in time from adjacent bursts as determined by said trigger signal.

41. A record comprising a disc having a groove formed therein, each side of said groove representing one channel of a recorded source signal combined with a degrade signal, said degrade signal being of a high enough frequency to be substantially inaudible upon playback of said record, said degrade signal further having one or more frequencies that will interact with the bias oscillator signals of magnetic media recording devices used to copy said record, said interaction causing harmonic signals to be generated, at least one of said harmonic signals causing the source signal recorded on the magnetic media to be distorted.

42. In a record having a continuous V-shaped groove formed therein, each side of the groove having modulations formed therein representative of one channel of a source signal, the improvement comprising modulations of said source signal combined with additional modulations representative of a degrade signal said degrade signal having a lowest frequency greater than about 17 KHz, and said degrade signal having at least one frequency that interacts with the bias oscillator signals of the magnetic recording heads so as to generate harmonic signals that are discernible when said magnetic recording is made and played back.

43. In a media for storing an audible source signal, the improvement comprising:
a degrade signal mixed with said source signal, said degrade signal being of a high enough frequency to be substantially inaudible upon playback of said media, said degrade signal further having one or more frequencies that will interact with the bias oscillator signals of magnetic recording devices used to copy said media, said interaction causing harmonic signals to be generated, at least one of said harmonic signals causing the source signal recorded by the magnetic recording device to be distorted upon playback.

* * * * *